United States Patent [19]

Hargrove

[11] Patent Number: 5,371,847
[45] Date of Patent: Dec. 6, 1994

[54] METHOD AND SYSTEM FOR SPECIFYING THE ARRANGEMENT OF WINDOWS ON A DISPLAY

[75] Inventor: Richard R. Hargrove, Redmond, Wash.

[73] Assignee: Microsoft Corporation, Redmond, Wash.

[21] Appl. No.: 949,401

[22] Filed: Sep. 22, 1992

[51] Int. Cl.⁵ .............................................. G06F 3/14
[52] U.S. Cl. .................................... 395/157; 395/161
[58] Field of Search ................ 395/157, 158, 161, 155

[56] References Cited

U.S. PATENT DOCUMENTS

| | | | |
|---|---|---|---|
| 4,961,070 | 10/1990 | Maher et al. | 395/158 X |
| 5,001,697 | 3/1991 | Torres | 395/139 X |
| 5,060,170 | 10/1991 | Bourgeois et al. | 395/157 X |

OTHER PUBLICATIONS

Constraint-Based Tiled windows (E. S. Cohent, E. T. Smith, L. A. Iverson), 1984, pp. 2-11.

D. Raker & H. Rice, Inside Autocad, 1989 pp. Intro-1,7; 3-8, 3-9, 5-10, 5-11, 8-8.

*Primary Examiner*—Heather R. Herndon
*Assistant Examiner*—Cliff Nguyen Vo
*Attorney, Agent, or Firm*—Seed and Berry

[57] ABSTRACT

A method and system for specifying the arrangement of windows on a display device [is provided]. [In a preferred embodiment of the present invention, a] A selection grid is displayed on the display device. The selection grid has a bounding rectangle which represents the bounds of the display device and has a plurality of lines extending vertically and horizontally across the bounding rectangle. A user selects which line segments should be removed from the selection grid. A line segment is defined by the intersection points of the vertical and horizontal lines. As the user selects a line segment, the line segment is removed from the selection grid. The line segments that are not selected define the arrangement for the windows. The computer system then arranges the windows on the display in accordance with the specified window arrangement.

36 Claims, 12 Drawing Sheets

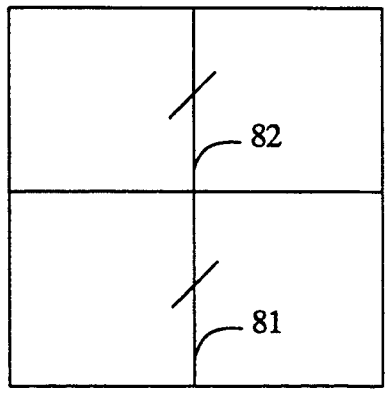 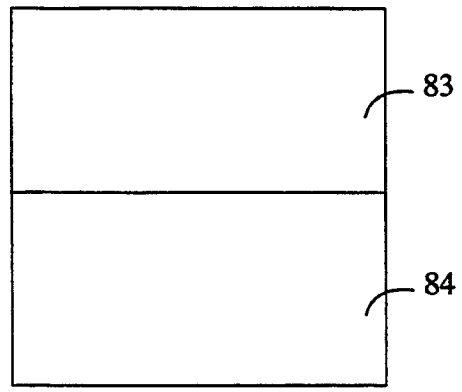
Figure 8A    Figure 8B
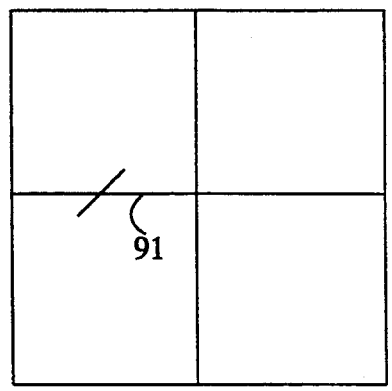 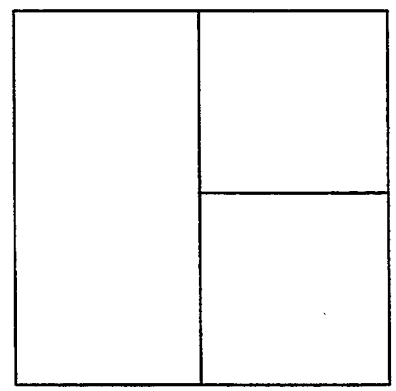
Figure 9A    Figure 9B
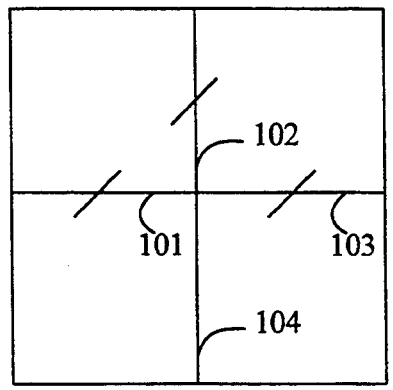 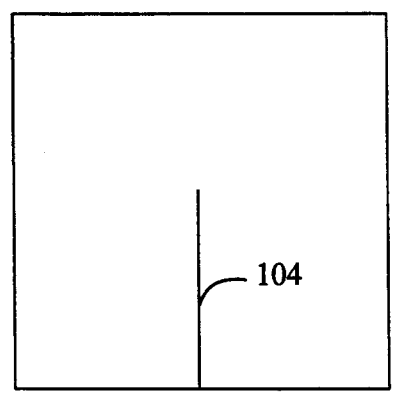
Figure 10A    Figure 10B

METHOD AND SYSTEM FOR SPECIFYING THE ARRANGEMENT OF WINDOWS ON A DISPLAY

DESCRIPTION

1. Technical Field

This invention relates generally to a computer method and system for displaying information, and more specifically, a method and system for specifying the arrangement of windows on a display.

2. Background of the Invention

Information generated by a computer program is often displayed on a display device. When multiple programs display information simultaneously on the same display device, a rectangular area of the display is typically allocated to each program. These rectangular areas are referred to as windows. The use of a window helps a user to identify which program generated the displayed information. A window typically includes a border to delimit the bounds of the window and a title bar to identify the program that is sending information to the window.

FIG. 1 is a diagram of a display showing three windows. The three windows, 101, 102, and 103, are in a tiled arrangement; that is, the windows are side-by-side and do not overlap one another. Each of the three computer programs can send data to the windows concurrently so that the data is displayed simultaneously. FIG. 2 is an example of overlapping windows. Window 201 overlaps window 203, and window 202 overlaps both window 201 and window 203. Most computer systems require that a window be rectangular. Computer systems allow for considerable flexibility in the arrangement of multiple windows on the display. FIG. 3 shows five windows in a tiled arrangement. A user can spend considerable time in arranging the windows. For example, to generate the window arrangement of FIG. 3, a user would need to individually size and move each window. To facilitate the arranging of windows, windowing systems, such as Windows by Microsoft Corporation, provide means for automatically arranging windows. These windowing systems allow for windows to be automatically arranged in a tiled arrangement. In response to requests to automatically generate a tiled arrangement with five windows, the windowing systems typically generate a window arrangement as shown in FIG. 3. FIG. 4 shows an automatically generated tiled arrangement for four windows.

Windowing systems also allow for windows to be automatically arranged in a cascaded arrangement. FIG. 5 shows five windows arranged in cascaded arrangement. Although cascading can be done quite efficiently when done automatically by the windowing system, it would be very time consuming for a user to size and move each window to arrange them as shown in FIG. 5.

Although the automatic cascading and tiling of windows relieves the user from the burden of sizing and moving windows, the windows are only automatically arranged in certain predefined arrangements. For example, when four windows are to be arranged, the automatic tiling will typically arrange the windows as shown in FIG. 4. If a user wants four windows arranged as shown in FIG. 6, then the user must manually size and move each window. Also, the only overlapping of windows that is automatically performed by a typical windowing system is the cascading of the windows. FIGS. 2 and 7 show overlapping windows that are not cascaded. A user would need to size and move each window manually to generate these arrangements.

Studies have been conducted to determine whether a window or a non-window environment provides a more efficient user interface. These studies have shown that tasks often take longer to complete in a window environment than in a non-window environment. The users in a window environment spend considerable time sizing and moving the windows and scrolling the windows to bring necessary information into view. These studies have also shown that, after eliminating the time to arrange the windows, the tasks were accomplished quicker in the window environment. Consequently, many window environments provide support for the automatic arrangement of windows.

SUMMARY OF THE INVENTION

It is an object of the present invention to provide a method and system for specifying the arrangement of windows on a display device.

It is another object of the present invention to provide a method and system for arranging windows on a display device in accordance with a user-specified arrangement.

It is another object of the present invention to provide a method and system for specifying a window arrangement that allows windows to be tiled.

It is another object of the present invention to provide a method and system that combines flexibility in arranging windows and efficiencies associated with automatic arrangement.

These and other objects, which will become apparent as the invention is more fully described below, are obtained by an improved method and system for specifying the arrangement of windows on a display device. In a preferred embodiment of the present invention, a selection grid is displayed on a display device. The selection grid has a bounding rectangle, which represents the bounds of the display device, and has a plurality of lines extending vertically and horizontally across the bounding rectangle. A user selects which line segments should be removed from the selection grid. A line segment is defined by the intersection points of the vertical and horizontal lines. As the user selects a line segment, the line segment is removed from the selection grid. When the user has completed selecting line segments, the line segments that are not removed define the arrangement for the positioning of windows within the main window of an application program. The computer system then arranges the windows on the display in accordance with the specified window arrangement.

BRIEF DESCRIPTION OF THE DRAWINGS

FIG. 8A through 13B show sample grid selections and resulting window arrangements.

DETAILED DESCRIPTION OF THE INVENTION

Figure 1:
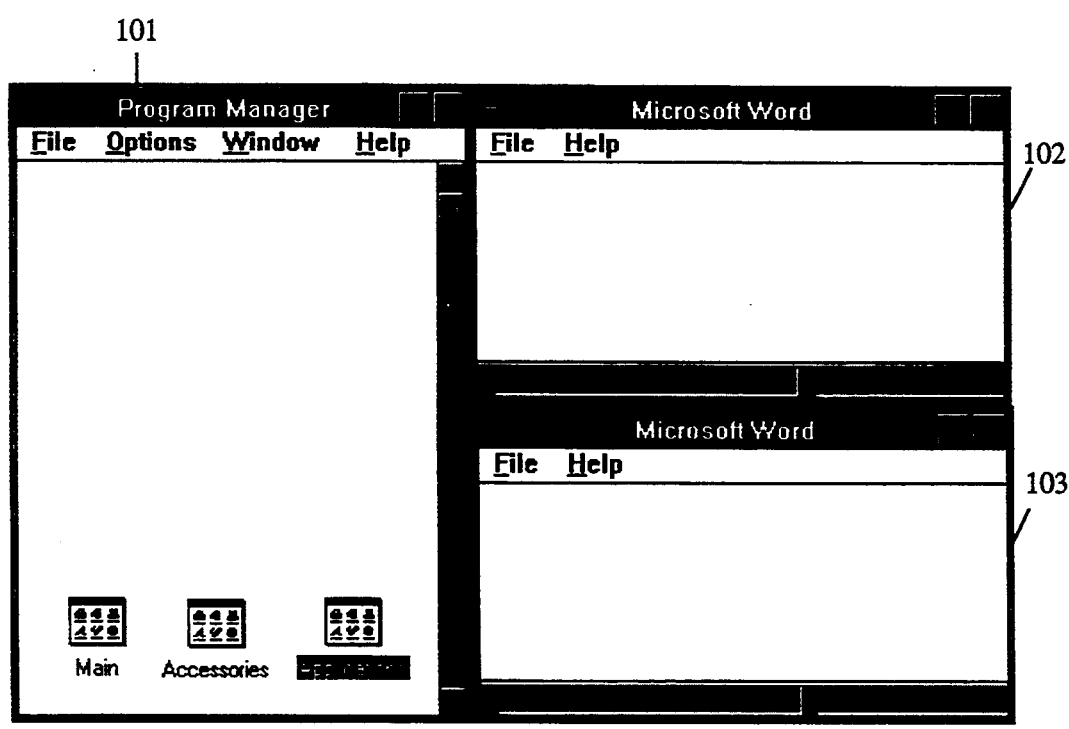
FIG. 1 is a display of three windows in a tiled arrangement.
Figure 2:
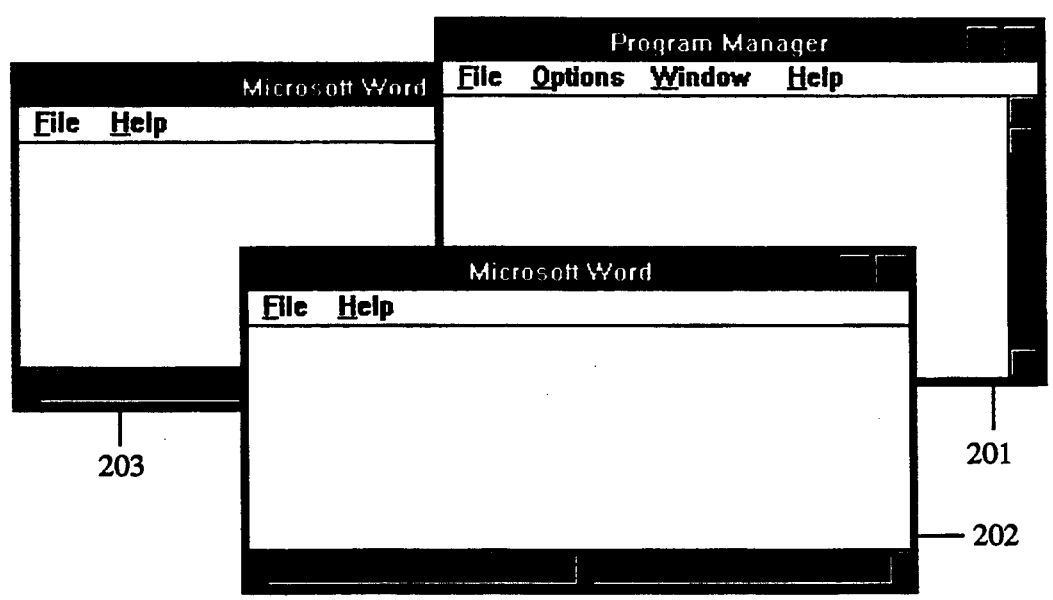
FIG. 2 is a display of three windows in an overlapped arrangement.
Figure 3:
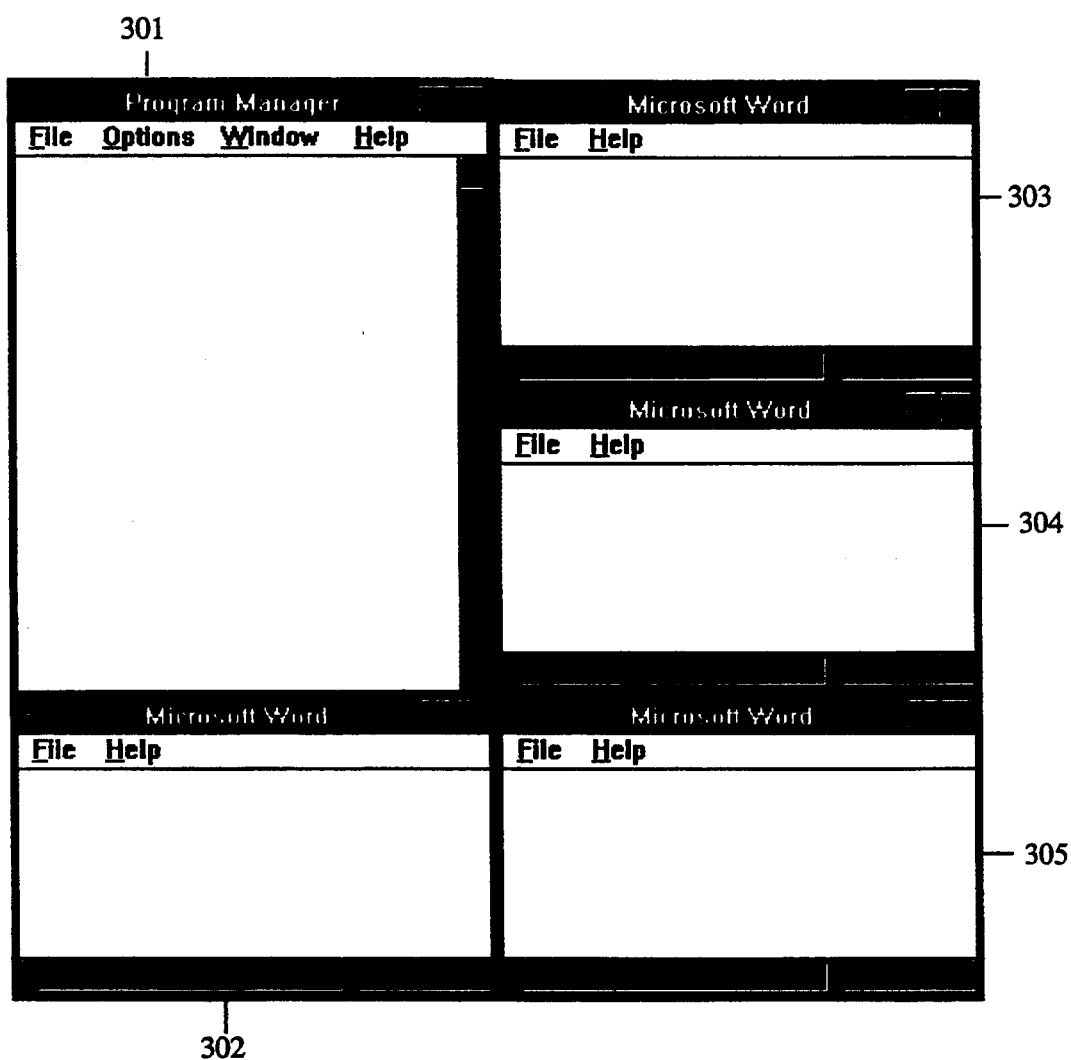
FIG. 3 is a display of five windows in a tiled arrangement.
Figure 4:
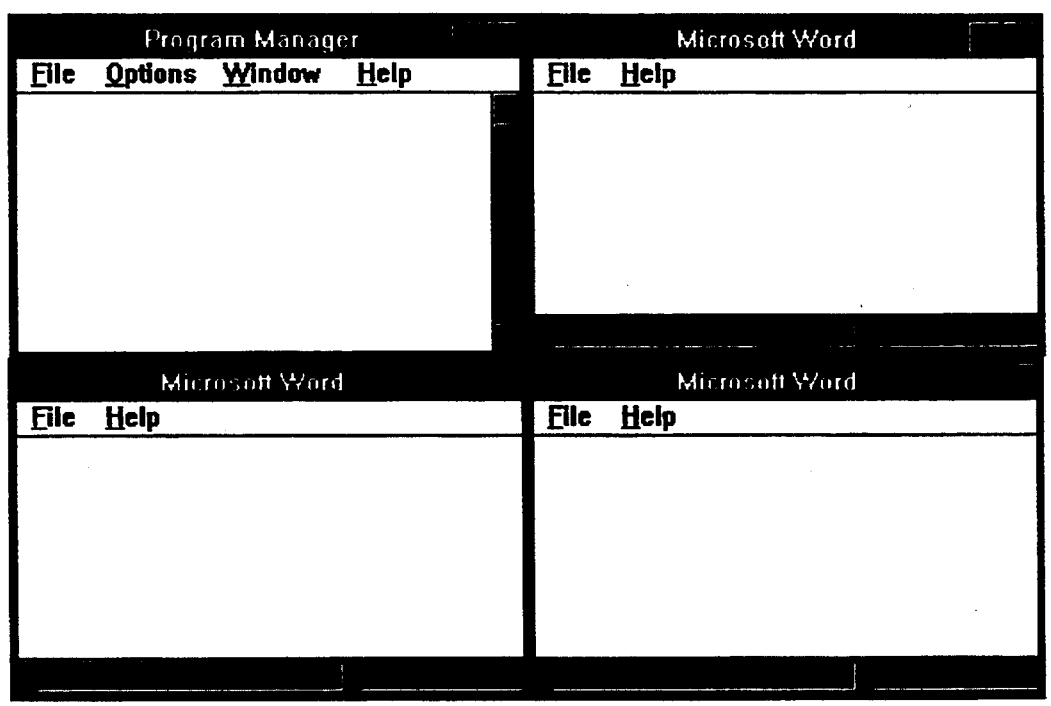
FIG. 4 is a display of four windows in a tiled arrangement.
Figure 5:
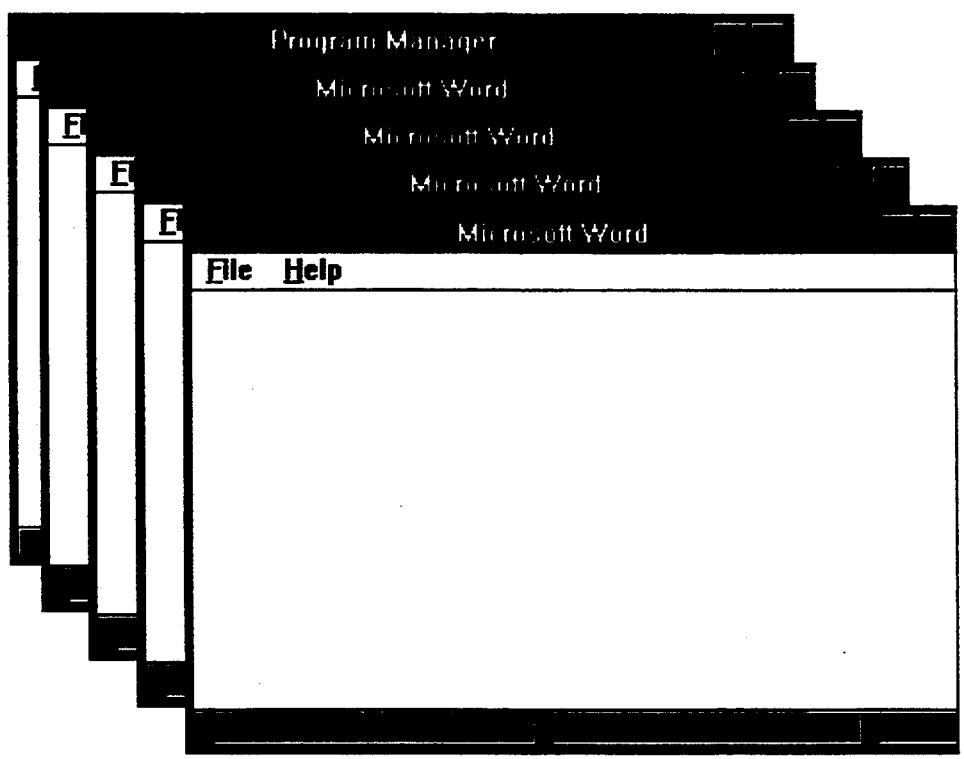
FIG. 5 is a display of five windows in a cascaded arrangement.
Figure 6:
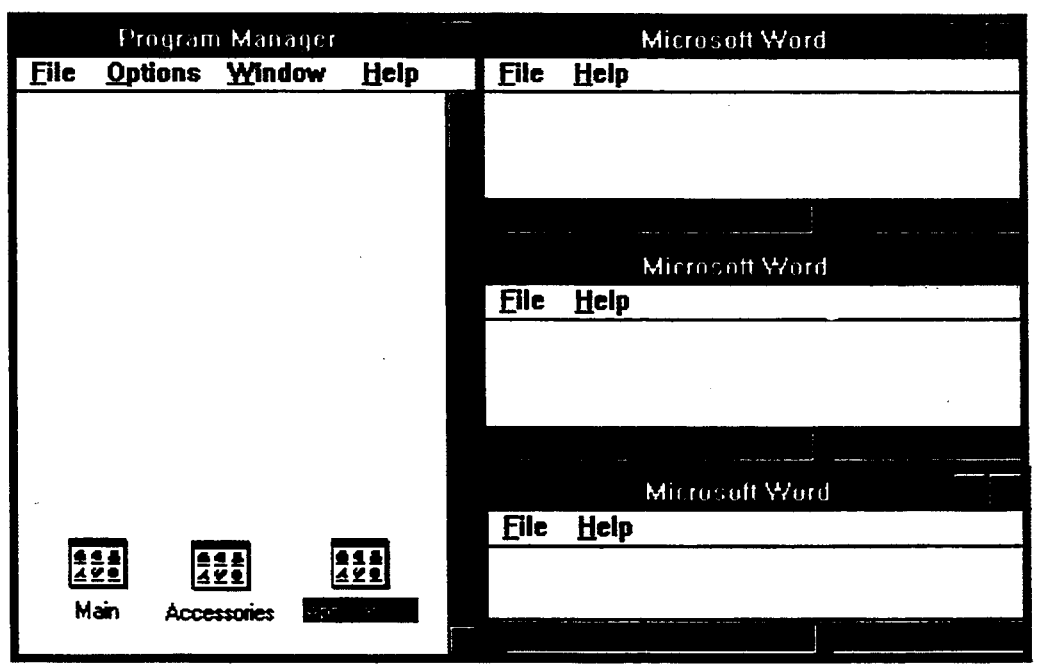
FIG. 6 is a display of four windows in a manually-generated tiled arrangement.
Figure 7:
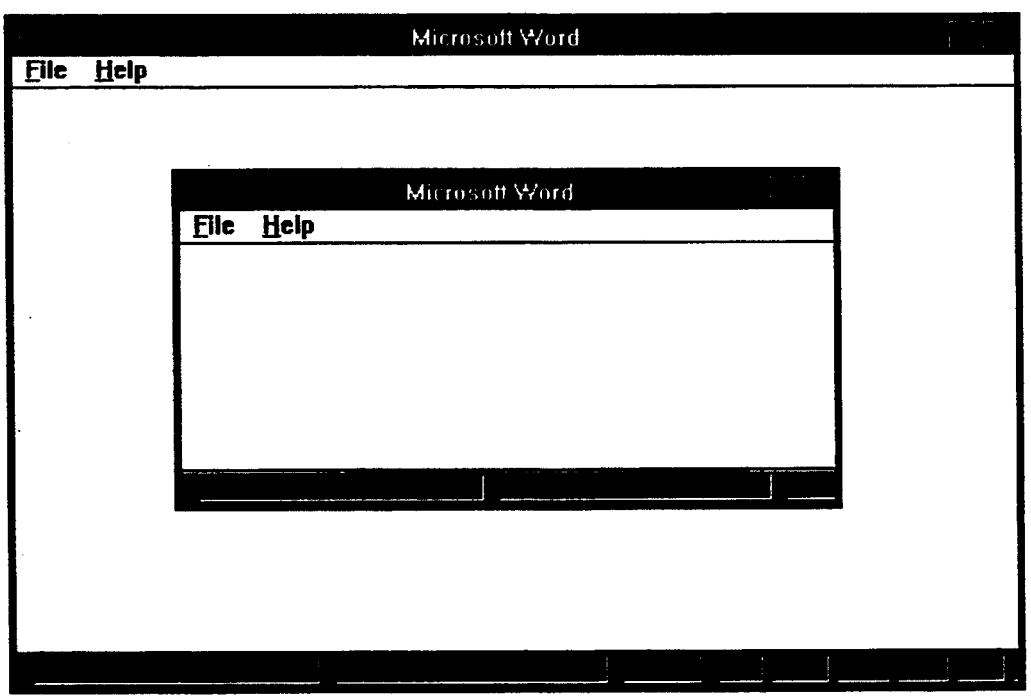
FIG. 7 is a display of two windows in a manually-generated overlapped arrangement.

The present invention provides a method and system for a user to specify the arrangement of windows on a display of a computer system. In a preferred embodiment of the present invention, a user specifies a window arrangement from a selection grid on the display. The user preferably inputs the number of rows and columns that the grid is to contain. The user then selects which line segments should be removed from the grid. The remaining line segments define the window arrangement.

FIGS. 8A through 13B show sample grid selections and resulting window arrangements. FIG. 8A shows a grid comprising two rows and two columns. The grid contains four quadrants. The user selects which line segments to remove from the grid to give the desired window arrangement. For example, in FIG. 8A, the slash across line segments 81 and 82 indicates that the user selects to remove line segments 81 and 82 from the grid. The resulting window arrangement is shown in FIG. 8B. In a preferred embodiment of the present invention, a user uses a pointing device, such as a mouse, to specify which line segments to remove from the grid. For example, in FIG. 8A when the user clicks on line segment 81, that line segment would be removed from the grid and when the user clicks on line segment 82, it would also be removed from the grid leaving the arrangement of FIG. 8B. It is preferable that if the user then reclicks at approximately where line segment 81 or 82 was, then the corresponding line segment would be redisplayed. This would allow the user to revise the selection grid. When the user has removed the appropriate line segments, the methods of the present invention would then arrange the windows on the display to correspond to the selected arrangement. For example, in FIG. 8B the display would comprise an upper window 83 and a lower window 84. If there were more than two open windows in the system, then the methods of the present invention would determine which two windows to display in windows 83 and 84. Conversely, if there was only one open window in the system, then either window 83 and 84 would be displayed, but one would be left empty.

FIG. 9 shows the selection of a window arrangement corresponding to FIG. 1. FIGS. 9A and 9B show the selection of line segment 91, which results in the window arrangement shown in FIG. 9B.

Not all selections of line segments result in valid window arrangements. The selection grid shown in FIG. 10A results in the invalid window arrangement request of FIG. 10B. In FIG. 10A the user selected line segments 101, 102, and 103. The resulting window arrangement is shown in FIG. 10B with line segment 104. Since the window is defined to be a rectangular area and since line segment 104 is not part of a rectangular area, the resulting window arrangement is invalid. It is preferable that the system of the present invention displays a warning message to the user and allows the user to either add another line segment or remove line segment 104.

Figure 11A:
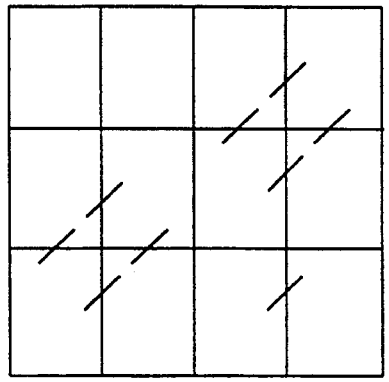
Figure 11B:
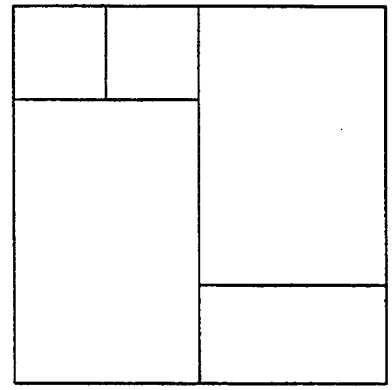
Figure 12A:
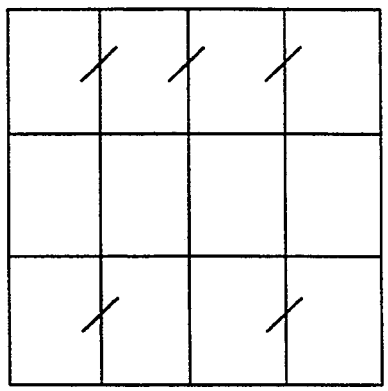
Figure 12B:
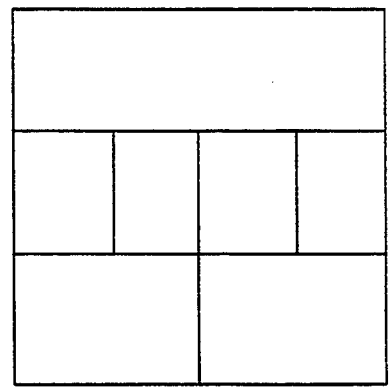
Figure 13A:
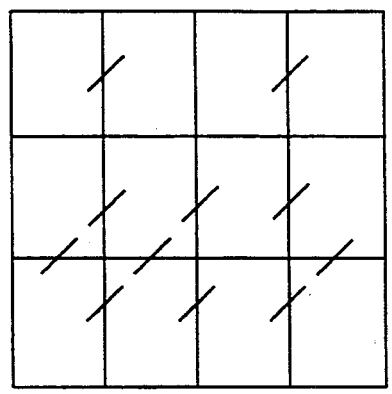
Figure 13B:
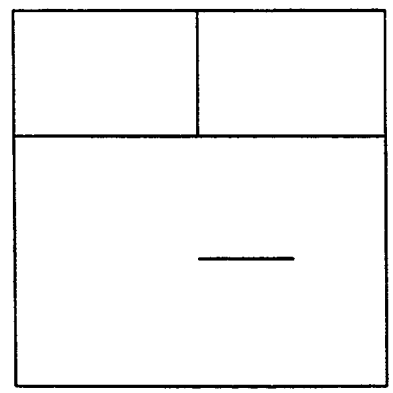

The method and system of the present invention preferably allows the user to specify the number of rows and columns to display on the grid. For example, in FIGS. 11A, 12A, and 13A the user specifies that the grid is to contain three rows and four columns. FIGS. 11A, 12A, and 13A show various window arrangements that the user may specify using a 3×4 grid.

Figure 14:
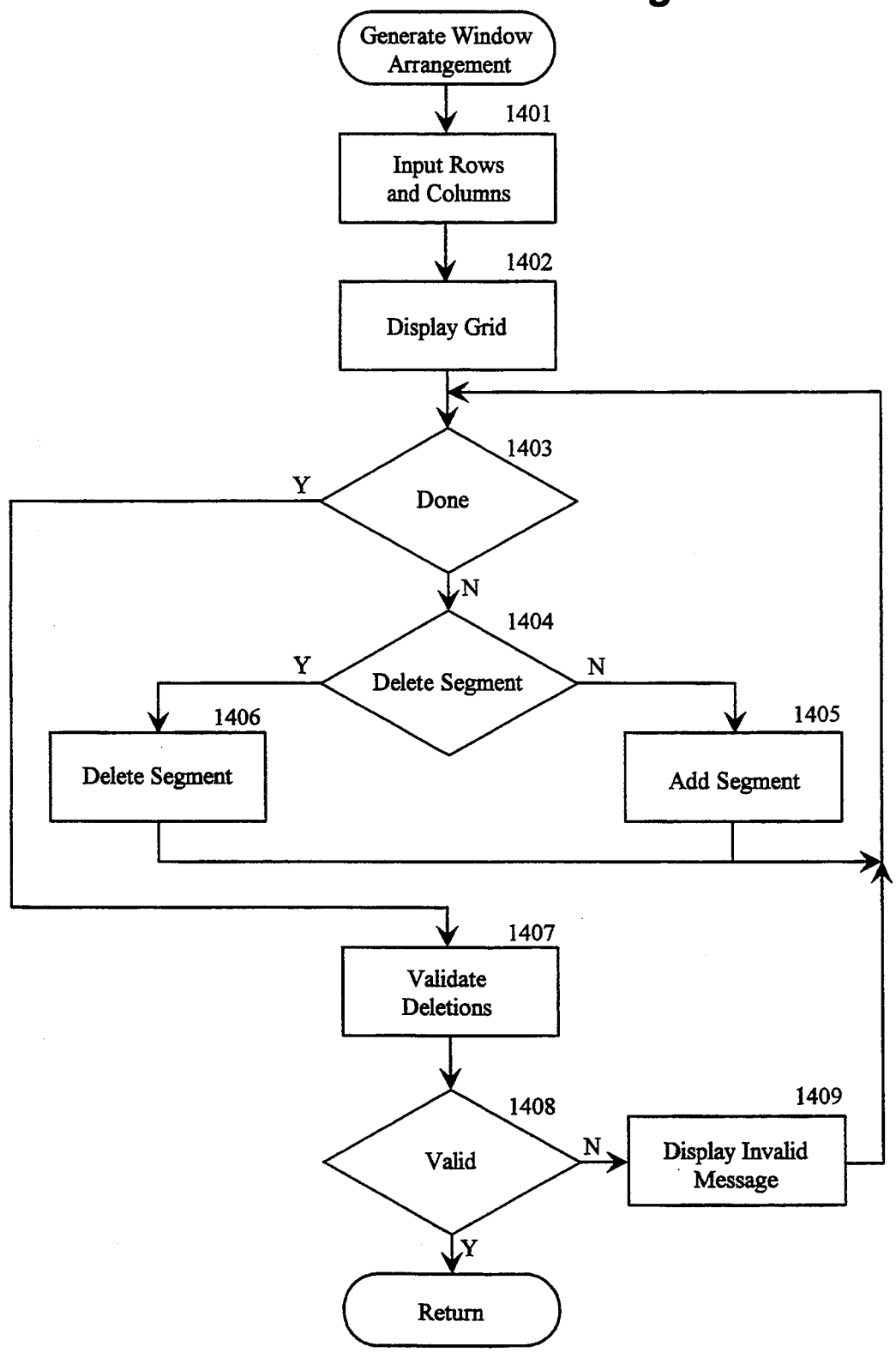
FIG. 14 is a flow diagram of a routine to input a user window arrangement selection.

FIG. 14 is a flow diagram of a routine to allow a user to specify a window arrangement. In step 1401, the routine inputs the number of rows and columns from the user. Alternatively, the routine uses a default number of rows and columns and allow the user to override these defaults. In step 1402, the routine displays a selection grid with the specified number of rows and columns. In steps 1403 through 1406, the routine loops, allowing the user to select and deselect the displayed line segments. In step 1403, if the user specifies that the selection is complete, the routine then continues at step 1407, else the routine continues at step 1404. In step 1404, the routine determines whether the selected line segment is to be removed from the selection grid or added back to the selection grid. In a preferred embodiment, when the user clicks near a line segment, that segment is removed from the selection grid. Conversely, if the user clicks near a removed line segment, then that line segment is added back to the selection grid. In an alternate embodiment, the routine allows a user to remove multiple line segments by holding down the mouse and dragging the cursor across various line segments. As the cursor crosses a line segment, the line segment is removed. In step 1404, if a line segment is to be removed, then the routine continues at step 1405, else the routine continues at step 1406. In step 1405, the routine removes the selected segment from the selection grid and loops back to step 1403. In step 1406, the routine adds the removed line segment back onto the selection grid and loops back to step 1403. In step 1407, the routine ensures that the user has specified a valid window arrangement. In step 1408, if the window arrangement is valid, then the window arrangement selection is complete and the routine returns, else the routine continues at step 1409. In step 1409, the routine displays an invalid window arrangement message and loops to 1403 to allow the user to correct the window arrangement.

Figure 15:
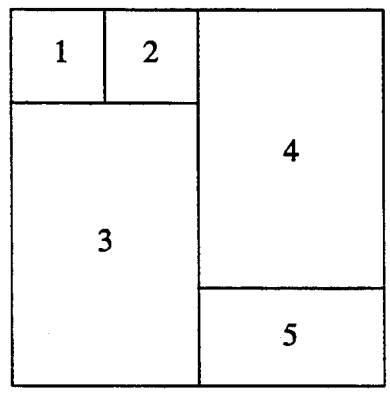
FIG. 15 is a display of a valid window arrangement.

A window arrangement is valid if each rectangle formed by the remaining line segments either (1) has at least one line that traverses it horizontally or vertically, or (2) has no line segments within it. FIG. 15 is a display of a valid arrangement. The window arrangement of FIG. 15 defines 9 rectangles. Rectangles 1, 2, 3, 4, and 5 contain no line segments. Rectangles 4 and 5 form a larger rectangle that has a line that traverses it. Rectangles 1 and 2 form a larger rectangle that has a line that traverses it. Rectangles 1, 2, and 3 form a rectangle that has a line that traverses it. Rectangles 1, 2, 3, 4, and 5 form a rectangle the size of the screen that has a line that traverses it. Since each of these 9 rectangles has a line that traverses it or no line segments within it, then the window arrangement is valid.

Figure 16:
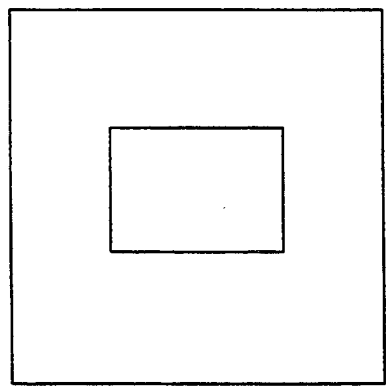
FIGS. 16 and 17 are displays of invalid window arrangements.
Figure 17:
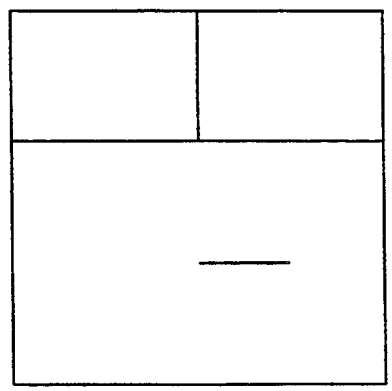

FIGS. 16 and 17 are displays of invalid window arrangements. In FIG. 16, since the rectangle corresponding to the perimeter of the screen has no traversing line, the window arrangement is an invalid arrangement. In FIG. 17, since the lower rectangle contains a line segment but has no line that traverses it, the window arrangement is invalid.

TABLE 1

```
for c = 0, cColumns-1
    for r = 0, cRows-1
        if (Point[r,c].south is not removed and
            Point[r,c].east is not removed) then
            If (~ValidRect(r, c)) then
                Invalid Arrangement
            endif
        endif
    endfor
endfor
Valid Arrangement ValidRect(r, c)
    ValidRect = FALSE
    Find the bottom-left corner
    Find the top-right corner
    if (segment missing on bottom or on right) then Return
    if (no segments within rectangle) then ValidRect=TRUE
    Return
```

Figure 18:
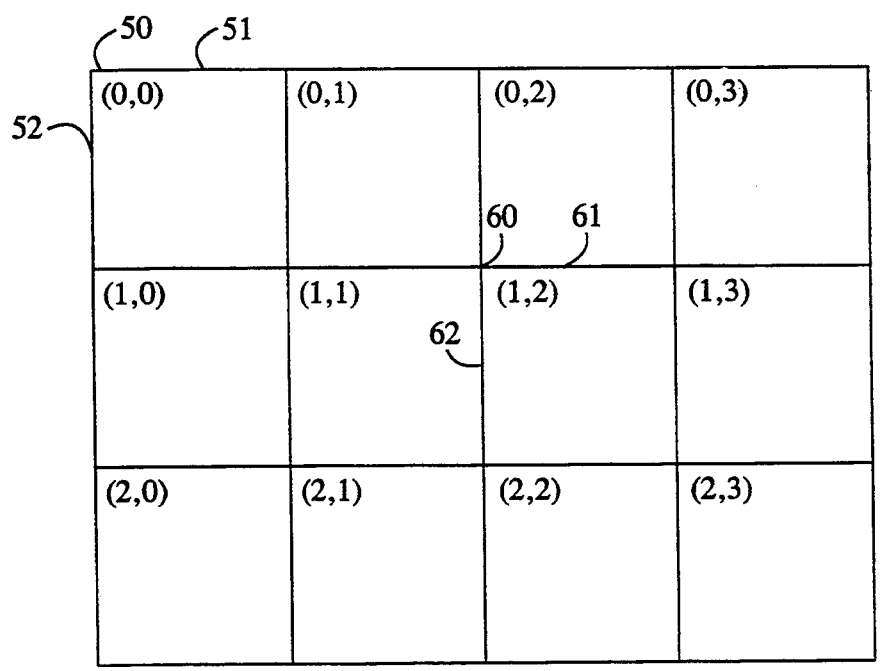
FIG. 18 is a diagram illustrating data structures used by a window layout validity algorithm.

Table 1 list pseudocode for an algorithm that determines whether a window arrangement is valid. FIG. 18 is a diagram illustrating data structures used by the algorithm. The upper-left corner of each rectangle in the selection grid is a point. Each point is identified by row and column number. For example, point 50 is identified by row number 0 and column number 0 (0,0), and point 60 is identified by row number 1 and column number 2 (1,2). The information specifying the window arrangement is stored in array Point. Array Point is indexed by row and column number and contains two fields: south and east. These fields indicate whether the line segment below (south) and the line segment to the right (east) of the point have been removed. Line segment 51 is east of point 50, and line segment 52 is south of point 50. Line segment 61 is east of point 60, and line segment 62 is south of point 60. If line segment 61 were removed, then Point[1,2].east would indicate removed and Point[1,2].south would indicated not removed.

The algorithm determines validity of a window arrangement as follows. The algorithm loops selecting each point. If the selected point has both the south and east line segments present, then the point may be an upper-left corner of a valid rectangle and the algorithm determines rectangle validity, otherwise the algorithm loops to select the next point. The algorithm determines rectangle validity by first searching for the lower-left corner. The algorithm checks each point below the selected point until if finds a point with a east line segment, which indicates a corner. If the algorithm encounters a point with a south line segment removed before encountering a point with an east line segment, then the rectangle is invalid. The algorithm then searches for the upper-right corner. The algorithm checks each point to the right of selected point until if finds a point with a south line segment, which indicates a corner. If the algorithm encounters a point with a east line segment removed before encountering a point with a south line segment, then the rectangle is invalid. Finally, if there are line segments within the rectangle, then the rectangle is invalid. Otherwise, the algorithm loops to select the next point. The window arrangement is valid if all points are processed without encountering an invalid rectangle.

Although the methods and systems of the present invention have been disclosed and described in terms of a preferred embodiment, it is not intended that the present invention be limited to such embodiments. Modifications within the spirit of the invention will be apparent to those skilled in the art. The scope of the present invention is defined by the claims that follow.

I claim:

1. A method in a computer system for specifying a display arrangement for a plurality of windows, the computer system having a display device, the method comprising the steps of:

displaying on the display device a selection grid, the selection grid having a bounding rectangle with a height and a width, and having a vertical line extending the height of the bounding rectangle and a horizontal line extending the width of the bounding rectangle, the vertical and horizontal lines intersecting to form a plurality of line segments; and selecting a plurality of the line segments wherein the bounding rectangle and the line segments that are not selected define the display arrangement for the plurality of windows.

2. The method of claim 1 including the step of after selecting a line segment, removing the selected line segment from the display device.

3. The method of claim 2 including the step of displaying a previously removed line segment in response to an indication that the previously removed line segment should be deselected.

4. The method of claim 1 wherein a line segment is selected using a pointing device.

5. The method of claim 4 wherein the painting device has a button and a cursor is displayed on the device and wherein a plurality of line segments is selected by depressing the button, moving the cursor across line segments to be selected, and releasing the button wherein the line segments that the cursor moved across while the button was depressed are selected.

6. The method of claim 4 wherein the pointing device is a mouse.

7. The method of claim 1 including the step of receiving from a user an indication of a number of vertical and a number of horizontal lines to include in the selection grid.

8. The method of claim 7 wherein the indication is a number of rows and columns to be displayed in the selection grid, from which the number of vertical and the number of horizontal lines is derived.

9. A method in a computer system for arranging a plurality of windows on a display device, each window having a display geometry indicating location and size of the window on the display device, the method comprising the steps of:

displaying on the display device a selection grid, the selection grid having a bounding rectangle with a height and a width, and having a vertical line extending the height of the bounding rectangle and a horizontal line extending the width of the bounding rectangle, the vertical and horizontal lines intersecting to form a plurality of line segments;

selecting a plurality of the line segments wherein the bounding rectangle and the line segments that are not selected define a display arrangement for the plurality of windows; and defining the geometry of the plurality of windows to correspond to the geometry of the defined display arrangement.

10. The method of claim 9 including the step of after selecting a line segment, removing the selected line segment from the display device.

11. The method of claim 10 including the step of displaying a previously removed line segment in response to an indication that the previously removed line segment should be deselected.

12. The method of claim 9 including the step of receiving from a user an indication of a number of vertical and a number of horizontal lines to include in the selection grid.

13. The method of claim 12 wherein the indication is a number of rows and columns to be displayed in the selection grid, from which the number of vertical and the number of horizontal lines is derived.

14. A method in a computer system for specifying a display arrangement for a plurality of windows, the computer system having a display device, the method comprising the steps of:
displaying on the display device a selection grid, the selection grid having a bounding rectangle and having a plurality of lines extending across the bounding rectangle; and
selecting a line wherein the bounding rectangle and the lines that are not selected define the display arrangement for the plurality of windows.

15. The method of claim 14 including the step of after selecting a line, removing the selected line from the display device.

16. The method of claim 15 including the step of redisplaying a previously removed line in response to an indication that the previously removed line should be deselected.

17. A computer system for specifying a display arrangement for a plurality of windows comprising:
a computer;
a display device operatively connected to the computer for displaying a plurality of windows;
means for displaying on the display device a selection grid, the selection grid having a bounding rectangle with a height and a width, and having a vertical line extending the height of the bounding rectangle and a horizontal line extending the width of the bounding rectangle, the vertical and horizontal lines intersecting to form a plurality of line segments; and
means for selecting a plurality of the line segments wherein the bounding rectangle and the line segments that are not selected define the display arrangement for the plurality of windows.

18. The computer system of claim 17 including means for removing selected line segments from the display device.

19. The computer system of claim 18 including means for deselecting a previously selected line segment and means for displaying a deselected line segment.

20. The computer system of claim 17 including a pointing device for selecting a line segment.

21. The computer system of claim 17 including a mouse for selecting a line segment.

22. The computer system of claim 17 including means for indicating a number of vertical lines extending the height of the selection grid and a number of horizontal lines extending the width of the selection grid.

23. A method in a computer system for arranging windows on a display device, each window having a display geometry indicating location and size of the window on the display device, the method comprising the steps of:

receiving from a user an indication of a number of rows and columns of windows to include in a display grid;
developing a window arrangement wherein the windows are to be arranged in accordance with the received number of rows and columns; and
adjusting the geometry of a plurality of windows to correspond to the developed window arrangement.

24. A method in a computer system for specifying a display arrangement for a plurality of windows, the computer system having a display device, the method comprising the steps of:
displaying on the display device a selection grid, the selection grid having a bounding rectangle, and having a plurality of lines extending from a side of the bounding rectangle to another side of the bounding rectangle; and
selecting one of the plurality of lines to exclude from the selection grid, wherein the bounding rectangle and lines that are not selected define the display arrangement for the plurality of windows.

25. The method of claim 24 including the step of, after selecting one of the plurality of lines, removing the selected line from the display device.

26. The method of claim 25 including the step of displaying a previously removed line in response to an indication that the previously removed line should be deselected.

27. The method of claim 24 wherein the line is selected using a pointing device.

28. The method of claim 27 wherein the pointing device has a cursor to indicate motion, and wherein lines are selected by dragging the pointing device and moving the cursor across lines to be selected, wherein each line that the cursor moves across while dragging the pointing device is selected.

29. The method of claim 27 wherein the pointing device is a mouse.

30. A method in a computer systems for specifying a display arrangement for a plurality of windows, the computer system having a display device, each window having a window geometry with lines defining the size of the window and with a position defining the location of the window on the display device, the method comprising the steps of:
altering the window geometry of a window displayed on the display device;
displaying on the display device a selection grid, the selection grid having a bounding rectangle, and having a plurality of lines distinct from the lines of the window geometries of the plurality of windows, wherein the plurality of lines of the selection grid symbolically represents the lines of the plurality of windows as altered, and wherein the intersecting lines of the selection grid form a plurality of line segments; and
selecting a plurality of line segments to exclude from the selection grid, wherein the bounding rectangle and the line segments that are not selected define the display arrangement for the plurality of windows.

31. The method of claim 30, further including the step of adjusting the window geometries of the plurality of windows according to the defined display arrangement.

32. A method in a computer systems for specifying a display arrangement for a plurality of windows, the computer system having a display device, each window having a window geometry with lines defining the size of the window and with a position defining the location of the window on the display device, the method comprising the steps of:

displaying on the display device a selection grid, the selection grid having a bounding rectangle, and having a plurality of lines distinct from the lines of the window geometries of the plurality of windows, wherein the plurality of lines of the selection grid symbolically represents the lines of the plurality of windows, and wherein the intersecting lines of the selection grid form a plurality of line segments; and selecting a plurality of line segments to exclude from the selection grid wherein the bounding rectangle and the line segments that are not selected define the display arrangement for the plurality of windows.

33. A computer system for specifying a display arrangement for a plurality of windows, each window having a window geometry with lines defining the size of the window and with a position defining the location of the window, the computer system comprising:

a display device for displaying a selection grid, the selection grid having a bounding rectangle, and having a plurality of lines distinct from the lines of the window geometries of the plurality of windows, wherein the plurality of lines of the selection grid symbolically represents the lines of the plurality of windows, and wherein the intersecting lines of the selection grid form a plurality of line segments;

an input device for receiving a selection of a plurality of line segments to exclude from the selection grid; and a window arrangement definition mechanism for defining the display arrangement for the plurality of windows based upon the bounding rectangle and the line segments that are not selected.

34. The computer system of claim 33, further comprising a window arranger for arranging the window geometries of the plurality of windows in accordance with the defined display arrangement.

35. A computer system for specifying a display arrangement for a plurality of windows comprising:

a selection grid having a bounding rectangle and having a plurality of lines extending across the bounding rectangle;

a display device for displaying the selection grid;

an input device for selecting a line;

a display arrangement definition mechanism for defining the display arrangement for the plurality of windows using the bounding rectangle of the selection grid and the lines that are not selected.

36. The computer system of claim 35 wherein the selection grid, responsive to the selection of a line using the input device, causes the selected line to be removed from the display device.

* * * * *

UNITED STATES PATENT AND TRADEMARK OFFICE
CERTIFICATE OF CORRECTION

PATENT NO. : 5,371,847

DATED : December 6, 1994

INVENTOR(S) : Richard R. Hargrove

It is certified that error appears in the above-identified patent and that said Letters Patent is hereby corrected as shown below:

In column 6, claim 5, line 29, please delete "painting" and substitute therefor --pointing--.

In column 6, claim 5, line 30, after "on the" and before --device--, please insert "display".

Signed and Sealed this

Eighteenth Day of April, 1995

Attest:

BRUCE LEHMAN

Attesting Officer

Commissioner of Patents and Trademarks